3,117,879
STERILE CREAM PRODUCT
Arthur M. Swanson, Madison, Wis., assignor to Wisconsin Alumni Research Foundation, Madison, Wis., a corporation of Wisconsin
No Drawing. Filed Mar. 6, 1961, Ser. No. 93,365
7 Claims. (Cl. 99—212)

The present invention relates to an improved sterile cream product and the process of preparing the same.

Many attempts have been made in the art to prepare a canned cream product that could be stored for relatively long periods of time prior to opening and that could be kept under refrigeration for relatively long periods of time after opening. Pasteurized fluid cream products were found unsatisfactory due to relatively short keeping times and the art for the most part has been directing its investigations to the production of a stable sterilized product. The sterilized cream products, however, were found to be unstable in that on standing they were subject to fat separation and/or gelation and in this condition unsalable. Also, products sterilized in the can were found to be generally unsatisfactory due to off-color and off-taste, e.g. dark in color with a cooked flavor.

In my investigations in this field, I discovered that a stable sterilized cream product containing about 10–35% by weight of milk fat could be prepared by standardizing cream (e.g. by adding non-fat milk solids or water), to provide a final product in which the ratio by weight of milk fat to non-fat milk solids is about 2 to 1. In addition to the critical milk fat to non-fat-milk-solids ratio, the product which is sterilized is also homogenized to break up the milk fat so that the fat is present in the sterilized product as small particles with diameters under, e.g. up to about 2 microns, and preferably less than 2 microns. Double homogenization is also preferred to provide for fat particles of the desired small size. Where in standardizing the product, in addition to liquids (skim milk or water) or solids-not-fat (skim milk powder) additional milk fat can be added, where required, to establish the proper ratio described above.

GENERAL PROCEDURE

To good quality cream containing about 10–35% by weight of milk fat is first added sufficient non-fat milk solids in the form of skim milk powder or low heat condensed skim milk or water or mixtures of the same or the like, to bring the non-fat milk solids to about 45 to 55% by weight of the milk fat content in the cream. The resulting product is next forewarmed by conventional procedures, e.g. at about 145° F. up to about 195° F. for up to thirty minutes or 165–285° F. for about one (1) second up to about 66 seconds, or various combinations in between, and the resulting pasteurized product, with or without homogenization, is then sterilized at about 295° F. for about 1–3 seconds. The sterile product is next flash cooled with or without deaeration and then subjected to a homogenizing operation with the first stage at about 2000–3000 lbs. pressure and the second stage at about 500 lbs. pressure to break up the milk fat into small particles with the diameters in the range specified above. The homogenized, sterile product is then cooled in a closed system and aseptically canned.

In a preferred procedure, the cream after the forewarming treatment is homogenized at about 2000–3000 lbs. pressure, and the cream after the sterilization treatment is cooled and held at about 200° F. for about 1–10 minutes. Heating of the cream and holding at about 200° F. for about 1–10 minutes prior to sterilization in place of holding after sterilization, can also be employed where desired.

The following specific examples will serve to illustrate the invention.

Example I

To a good quality cream containing about 18% milk fat and about 7.2±0.3% non-fat milk solids is first added sufficient skim milk powder to increase the non-fat milk solids about 2%, i.e. to bring the non-fat milk solids in the cream up to about 9.2±0.3%. The cream is then pasteurized at about 165° F. for about 30 minutes. The pasteurized cream is then homogenized at about 2500 pounds pressure. The homogenized cream is then sterilized at about 295° F. for 3 seconds and held at about 200° F. for about 3 minutes. The sterile product is next flash cooled to about 160° F. with deaeration and then homogenized again with the first stage at about 2500 lbs. pressure and a second stage at about 500 lbs. pressure. The sterile, double homogenized product is then cooled to about 65° F. and canned under aseptic conditions.

Example II

This example follows Example I, except that the product after the initial homogenizing operation, is first held at about 200° F. for about 3 minutes and then sterilized before flash cooling and the second homogenizing operation. As noted above, the holding step can take place either prior to as well as after the sterilizing step.

Example III

This example follows Example I, except that the holding step after sterilization is eliminated and sterilization is carried out at about 295° F. for one (1) second.

The holding step described above in preferred Examples I and II involves a time-temperature relationship and shorter times at higher temperatures or longer times at lower temperatures can be employed. Optimum conditions can also vary but can be readily ascertained by preliminary testing of the cream product being used.

The 2 to 1 ratio by weight of milk fat to non-fat milk solids is preferred although somewhat more non-fat milk solids can be employed if desired. However, as additional non-fat milk solids provide no substantial benefit as far as fat separation is concerned, it is preferred to stay within the approximate range of the described ratio to avoid other problems such as gelation, the tendency of which may be increased by use of non-fat milk solids substantially above the described ratio.

The improved sterile cream product of the present invention with the specified milk fat to non-fat-milk-solids ratio, has been found to be stable, e.g. it can be stored for about six months prior to opening and can be kept under refrigeration for several weeks (2–3 weeks) after opening. The product also does not have an off-taste and does not develop unclean, fruity flavors frequently associated with refrigerated cream products.

It is claimed:
1. The process which comprises standardizing cream to provide a fluid product with about 10–35% by weight of milk fat with a ratio by weight of milk fat to non-fat milk solids of about 2 to 1, pasteurizing the resulting product, sterilizing the pasteurized product at about 295° F. for about 1–3 seconds, flash cooling the resulting sterile product to about 160° F., homogenizing the resulting cooled sterile product to break up the milk fat into small particles with diameters up to about 2 microns, and aseptically canning the resulting homogenized product.
2. The process of claim 1, where the product is homogenized both prior to and after sterilization.
3. The process of claim 1, where the product is held at about 200° F. for about 1–10 minutes after sterilization and prior to homogenization.
4. The process of claim 1, where the product is held at about 200° F. for about 1-10 minutes after pasteurization and prior to sterilization.

5. The process which comprises adding non-fat milk solids to a good quality cream containing about 18% by weight of milk fat to provide a product with a ratio by weight of milk fat to non-fat milk solids of about 2 to 1, pasteurizing the resulting product, sterilizing the resulting pasteurized product at about 295° F. for 1-3 seconds, flash cooling the resulting sterile product to about 160° F., homogenizing the cooled sterile product with a first stage at about 2000-3000 lbs. pressure and a second stage at abount 500 lbs. pressure, and aseptically canning the resulting homogenized product.

6. The process of claim 5, where the added non-fat milk solids is skim milk powder and the pastuerized product is sterilized at about 295° F. for about one (1) second.

7. The process of claim 6, where the product is homogenized both prior to and after sterilization.

References Cited in the file of this patent

UNITED STATES PATENTS

| | | |
|---|---|---|
| 2,049,591 | Rafn | Aug. 4, 1936 |
| 2,603,568 | Nelson | July 15, 1952 |
| 2,860,057 | Wilcox | Nov. 11, 1958 |
| 2,899,320 | Davis et al. | Aug. 11, 1959 |

FOREIGN PATENTS

| | | |
|---|---|---|
| 497,649 | Great Britain | Dec. 19, 1938 |